Patented July 3, 1951

2,558,777

UNITED STATES PATENT OFFICE 2,558,777

HALOGENATED HYDROXYSTILBAZOLES AND DERIVATIVES THEREOF

Domenick Papa, Brooklyn, N. Y., and Erwin Schwenk and Erwin Klingsberg, Montclair, N. J., assignors to Schering Corporation, Bloomfield, N. J., a corporation of New Jersey No Drawing. Application October 15, 1946, Serial No. 703,282

13 Claims. (Cl. 260—289)

This invention relates to a new group of amebicidal compounds characterized by containing a halogenated hydroxyphenyl group attached to a nitrogen heterocyclic ring through a two-carbon-atom chain.

The compounds of the invention are derivatives of

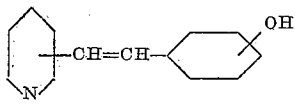

in which the hydroxyphenyl group contains at least one halogen. The pyridine ring may be replaced by its homologues and by the quinoline ring and its homologues and the heterocyclic ring system may be hydrogenated, for example, to the piperidyl ring. The aliphatic double bond may be hydrogenated. The phenyl hydroxyl may be esterified or etherified, for example, by an alkyl, carboxy alkyl or aryl group.

The compounds of the invention have the general formula:

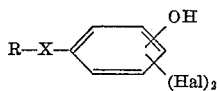

wherein R is a member of the group consisting of pyridine, quinoline and their lower alkyl mono-substitution products, X is an aliphatic hydrocarbon chain of two carbon atoms one carbon atom of which is attached to a carbon atom of the heterocyclic ring and the other carbon atom of which is attached to a carbon atom of the phenyl ring, and Hal represents a halogen of the group consisting of chlorine, bromine and iodine.

The compounds of the invention are active amebicidal agents with little or no toxic effect. In general, they are also bactericidal agents and are therefore particularly useful in the treatment of amebic disorders as they are likewise effective against the bacterial infections which are typically concomitants of amebic infections.

The compounds of the invention may be prepared by condensing a methyl pyridine with an aromatic aldehyde. The resulting stilbazole may then be subjected to hydrogenation and halogenation by known methods. For example, by condensing α-picoline (I) with p-hydroxybenzaldehyde (II) in the presence of acetic anhydride, there is obtained 4'-hydroxy-α-stilbazole (III) which on reduction and iodination gives 3',5'-diiodo-4'-hydroxy-α-dihydrostilbazole (IV) (α - (3,5 - diiodo - 4 - hydroxy - β - phenethyl)-pyridine). The reactions may be represented by the following equations:

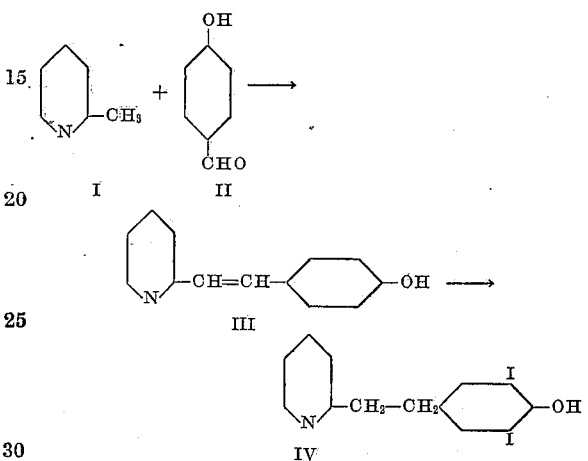

Bromination of 4'-hydroxy-α-dihydrostilbazole (V) gives 3',5'-dibrom-4'-hydroxy-α-dihydrostilbazole (VI) (α-(3,5- dibromo-4- hydroxy-β-phenethyl)pyridine).

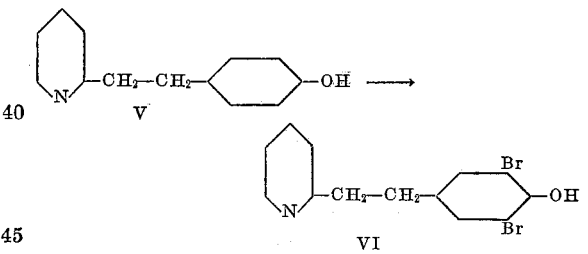

In place of α-picoline or p-hydroxybenzaldehyde, there may be substituted other pyridine derivatives or other aromatic aldehydes, and thus various isomeric or analogous compounds may be obtained. The following equations illustrate the preparation of several different types of halogenated stilbazoles and dihydrostilbazoles.

1. Condensation of lutidine (VII) with 3,5-diiodo-4-hydroxybenzaldehyde (VIII) to 2-(3,5-diiodo-4-hydroxystyryl)-6-methylpyridine (IX).

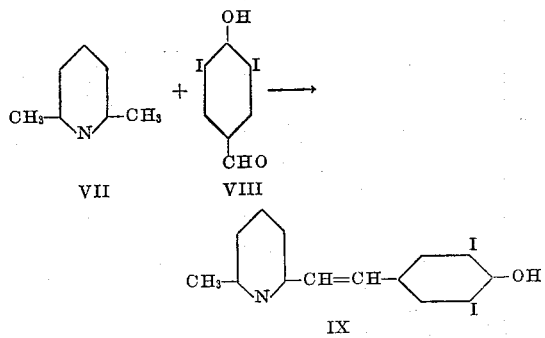

2. Condensation of γ-picoline (X) with o-hydroxybenzaldehyde (XI) to γ-(3,5-diiodo-2-hydroxystyryl)pyridine (XII).

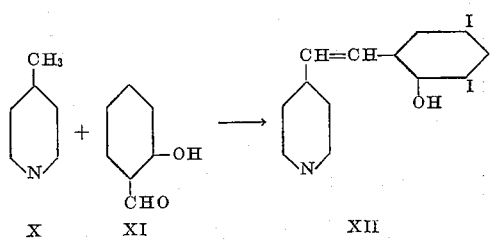

3. Condensation of nitrobenzaldehyde (XIII) and γ-picoline (X), reduction of the nitro group and double bonds, and iodination and diazotization for the removal of the amino group gives γ-(3,5-diiodo-β-phenethyl)pyridine (XIV).

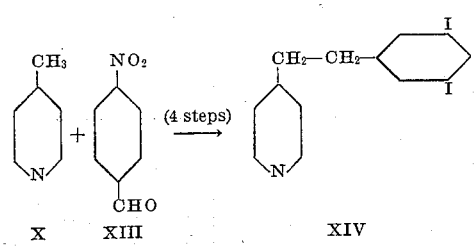

4. Condensation of α-picoline (I) with p-hydroxybenzaldehyde (II) and reduction of the double bond and pyridine ring system followed by iodination of the hydrogenated product gives α-(3,5-diiodo-4-hydroxy-β-phenethyl)piperidine (XV).

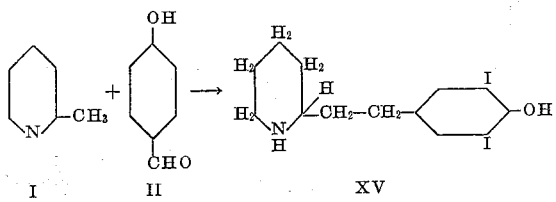

Many variations of the aforementioned examples may be made by substituting, in place of the pyridine derivative, either 2-methyl- or 4-methyl-quinoline. For example, by condensing 2-methylquinoline (XVI) with p-hydroxybenzaldehyde (II), then reducing and iodinating, there results α-(3,5-diiodo-4-hydroxy-β-phenethyl)-quinoline.

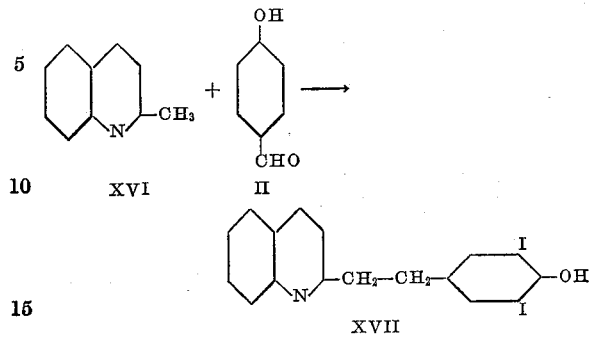

Another illustration of the application to the quinoline ring system is the use of nitrobenzaldehyde (XIII) and methylquinoline. After several chemical manipulations, as previously illustrated, there results α-(3,5-diiodo-β-phenethyl)-quinoline, of the following formula:

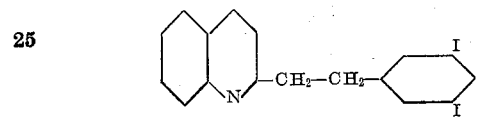

Most of the substances described have groups which can be further substituted. For example, the hydroxy group may be converted into derivatives, such as the acetoxy, the methoxy, the carbomethoxy, etc., in the known manner. 3',5'-diiodo-4'-hydroxy-α-dihydrostilbazole, on treatment with chloracetic acid in the known manner, gives the α-(3,5-diiodo-4-carbomethoxy-β-phenethyl)pyridine of the following formula:

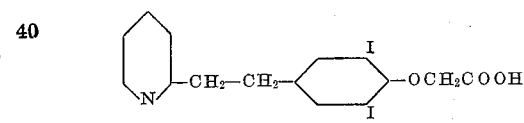

By condensation of two molecules of a benzaldehyde with a dimethyl pyridine bis-styryl pyridines and bis-phenethyl pyridines may be obtained. For example, condensation of 2 mols of 4-hydroxybenzaldehyde (II) with lutidine (VII) followed by hydrogenation and iodination gives the a,a'-bis(3,5-diiodo-4-hydroxyphenethyl)pyridine of the following formula:

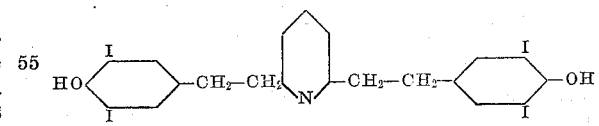

An interesting feature of the substances of the invention is the basic function which renders them soluble in acid media. Such compounds on oral administration dissolve in the stomach and thus constitute contrast agents for this organ. It is possible to isolate the hydrochlorides of many of these iodinated condensation products, and in this form they are reasonably soluble in water. Their use as contrast agents is not necessarily limited by the presence of the basic group, since they also contain alkali-soluble groups. Thus, these substances are useful in the visualization not only of the stomach but also of other organs.

The various compounds which have been described above may be subjected to further hydrogenation than the elimination of the aliphatic double bond. For example, in the catalytic high pressure hydrogenation of 4'-hydroxy-α-stilbazole, there may be isolated in addition to the dihydro derivative the following two substances:

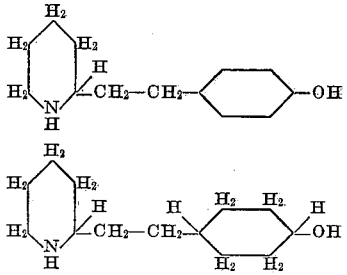

The substance with the reduced pyridine ring may be methylated and iodinated to give α-(3,5-diiodo-4-hydroxy-β-phenethyl)-N-methylpiperidine of the following formula:

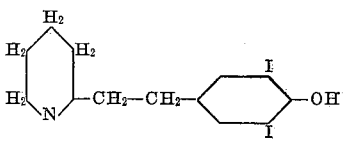

This procedure may also be applied to the other compounds described in the examples.

Many variations in the methods of synthesis described may be made without departing from the principles of the invention.

The following examples are illustrative of the various methods of obtaining the compounds of the invention. Temperatures are in degrees centigrade.

*Example 1.—3',5'-diiodo-2'-hydroxy-γ-dihydrostilbazole*

19.7 g. of 2'-hydroxy-γ-stilbazole is hydrogenated in accordance with known methods. The hydrogenated product, after isolation and recrystallization from aqueous ethanol, forms long, fine, white needles melting at 164–165°.

19.9 g. of the recrystallized, hydrogenated hydroxystilbazole is dissolved in 1200 cc. of water in which 80 g. of sodium hydroxide have been dissolved. To this solution there is added dropwise, with stirring, a solution of 50.8 g. of KI and 50.8 g. of iodine dissolved in 500 cc. of water. It is recommended that the iodination be carried out with the exclusion of light, since the iodo compound is somewhat sensitive to light. When the iodination is completed, the reaction mixture is treated with sulfur dioxide and then acidified to litmus paper with acetic acid. The crystalline product after filtration is recrystallized either from aqueous alcohol or from a mixture of chloroform and petroleum ether and then melts at 146–147°.

*Example 2.—3',5'-diiodo-2'-hydroxy-α-dihydrostilbazole*

This compound is prepared from 2-hydroxy-α-stilbazole as described in Example 1 and melts at 126–128°, after recrystallization from dilute ethanol.

*Example 3.—3',5'-diiodo-4'-hydroxy-α-dihydrostilbazole*

This compound is prepared from 4'-hydroxy-α-stilbazole as described for Example 1, and after recrystallization from aqueous alcohol melts at 170–171°.

*Example 4.—3',5'-diiodo-4'-hydroxy-γ-dihydrostilbazole*

This compound is prepared from 4'-hydroxy-γ-stilbazole as described under Example 1, and after recrystallization from aqueous alcohol melts at 163–164°.

*Example 5.—3',5'-diiodo-4'-acetoxy-6-methyl-α-stilbazole*

20 g. 3,5-diiodo-4-hydroxybenzaldehyde and 20 cc. of 2,6-lutidine are refluxed for 20–30 hours in 100 cc. of acetic anhydride. The reaction is cooled, poured into methanol, filtered, and then recrystallized from 95% ethanol. The acetoxy compound separates in long, fine, white needles melting at 188–189°.

*Example 6.—3',5'-diiodo-4'-hydroxy-6-methyl-α-stilbazole*

This compound results from that prepared under Example 5 by hydrolysis with alcoholic alkali. After crystallization from aqueous alcohol, it melts at 201–202°.

*Example 7.—α,α'-Bis-(3,5-diiodo-4-hydroxyphenethyl)pyridine*

The requisite intermediate for this product is prepared by condensing 2 mols of 4-hydroxybenzaldehyde with 2,6-lutidine in acetic anhydride. The reaction product after isolation and hydrolysis melts above 300° with decomposition and on hydrogenation with Raney's nickel catalyst in the known manner gives the 2,6-di-(4-hydroxy-β-phenethyl)pyridine melting at 180–181°, after crystallization from ethanol. It is iodinated in accordance with the directions given in Example 1 to yield a tetraiodo derivative.

*Example 8.—α-(3,5-diiodo-4-acetoxystyryl)quinoline*

This iodo derivative is prepared from quinaldine and 3,5-diiodo-4-hydroxybenzaldehyde by refluxing in acetic anhydride. The compound is isolated in the usual manner, and after crystallization from ethanol melts at 187–189°.

*Example 9.—α-(3,5-diiodo-4-hydroxystyryl)quinoline*

This compound is prepared from the acetoxy derivative described under Example 8 by hydrolysis with sulfuric acid in ethyl alcohol. The hydroxy compound is isolated in the known manner, and after recrystallization from alcohol melts at approximately 250° with decomposition.

*Example 10.—3',5'-dibrom-2'-hydroxy-α-dihydrostilbazole*

10 g. of 2'-hydroxy-dihydro-α-stilbazole is brominated with 16.3 g. of bromine in 30 cc. of acetic acid at room temperature with stirring. The addition of bromine is made over a period of about one hour and at the end of the addition a red compound separates out. After adding 500 cc. of water, the mixture is buffered with sodium acetate. A white crystalline material separates which is recrystallized from dilute ethanol. The dibrom compound separates in fine white needles melting at 116.5–117.5°.

*Example 11.—3',5'-dichloro-2'-hydroxy-α-dihydrostilbazole*

5 g. of 2'-hydroxy-α-dihydrostilbazole is dissolved in acetic acid and with stirring 3.84 g. of chlorine in acetic acid is added dropwise to this solution. After the addition, the solution is stirred for 20 minutes. The reaction mixture is then buffered with sodium acetate giving 4.8 g. of light brown solid melting at 114-116°. Recrystallization from dilute ethanol gives pure white platelets melting at 116.5-117°.

*Example 12.—Reduction products of 4'-hydroxy-α-stilbazole*

A solution of 19.7 g. of 4'-hydroxy-α-stilbazole in 300 cc. of ethanol is hydrogenated over Raney's nickel catalyst at an initial pressure of approximately 1500 pounds. The temperature of the hydrogenation was maintained between 80 and 100° for approximately 6 hours. After filtration of the catalyst, the ethanol solution is evaporated and diluted with water. The resulting white solid is leached with hot dilute sodium hydroxide and filtered. The insoluble material is the 4-[β-(2-piperidyl)ethyl] cyclohexanol which recrystallizes from dilute ethanol as white needles melting at 176-177°. Careful addition of acetic acid to the filtrate from the leaching precipitates the stilbazoline derivative, p-[β-(2-piperidyl)ethyl] phenol melting at 197-199°. Recrystallization from toluene raises the melting point to 199-200°.

We claim:

1. Compounds of the general formula

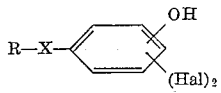

wherein R is a member of the group consisting of pyridine, quinoline and their lower alkyl mono-substitution products, X is an aliphatic hydrocarbon chain of two carbon atoms one carbon atom of which is attached to a carbon atom of the heterocyclic ring and the other carbon atom of which is attached to a carbon atom of the phenyl ring, and Hal represents a halogen of the group consisting of chlorine, bromine and iodine.

2. Compounds of the general formula

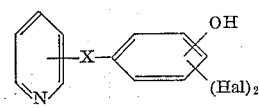

wherein X is an aliphatic hydrocarbon chain of two carbon atoms one carbon atom of which is attached to a carbon atom of the pyridine ring and the other carbon atom of which is attached to a carbon atom of the phenyl ring, and Hal represents a halogen of the group consisting of chlorine, bromine and iodine.

3. Compounds of the general formula

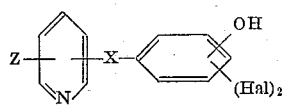

wherein X is an aliphatic hydrocarbon chain of two carbon atoms one carbon atom of which is attached to a carbon atom of the pyridine ring and the other carbon atom of which is attached to a carbon atom of the phenyl ring, Z represents a lower alkyl group, and Hal represents a halogen of the group consisting of chlorine, bromine and iodine.

4. Compounds of the general formula

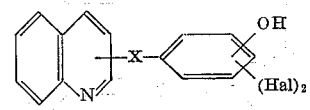

wherein X is an aliphatic hydrocarbon chain of two carbon atoms one carbon atom of which is attached to a carbon atom of the pyridine ring and the other carbon atom of which is attached to a carbon atom of the phenyl ring, and Hal represents a halogen of the group consisting of chlorine, bromine and iodine.

5. Compounds as defined in claim 2 wherein a carbon atom of X is attached to the 2-position of the pyridine ring.

6. Compounds as defined in claim 2 wherein Hal is iodine.

7. Compounds as defined in claim 2 wherein X is —CH:CH—.

8. Compounds as defined in claim 2 wherein X is —CH$_2$.CH$_2$—.

9. α-(3,5-diiodo-4-hydroxy-β-phenethyl) pyridine.

10. 2 - (3,5 - diiodo - 4 - hydroxystyryl) - 6-methylpyridine.

11. α-(3,5-diiodo-4-hydroxystyryl)-quinoline.

12. α - (3,5 - dibromo - 4 - hydroxy - β - phenethyl) pyridine.

13. α - (3,5 - dichloro - 2 - hydroxy - β - phenethyl) pyridine.

DOMENICK PAPA.
ERWIN SCHWENK.
ERWIN KLINGSBERG.

REFERENCES CITED

The following references are of record in the file of this patent:

UNITED STATES PATENTS

| Number | Name | Date |
|---|---|---|
| 2,126,337 | Mannes et al. | Aug. 9, 1938 |
| 2,255,077 | Middleton | Sept. 9, 1941 |
| 2,320,654 | Riester | June 1, 1943 |
| 2,338,782 | Reister | Jan. 11, 1944 |
| 2,355,659 | Lee et al. | Aug. 15, 1944 |

OTHER REFERENCES

Young: J. Org. Chem., vol. 10, pages 67 and 68 (1945).